Nov. 21, 1933.    W. W. CARSON, JR    1,936,325
TEMPERATURE REGULATOR
Filed May 12, 1931
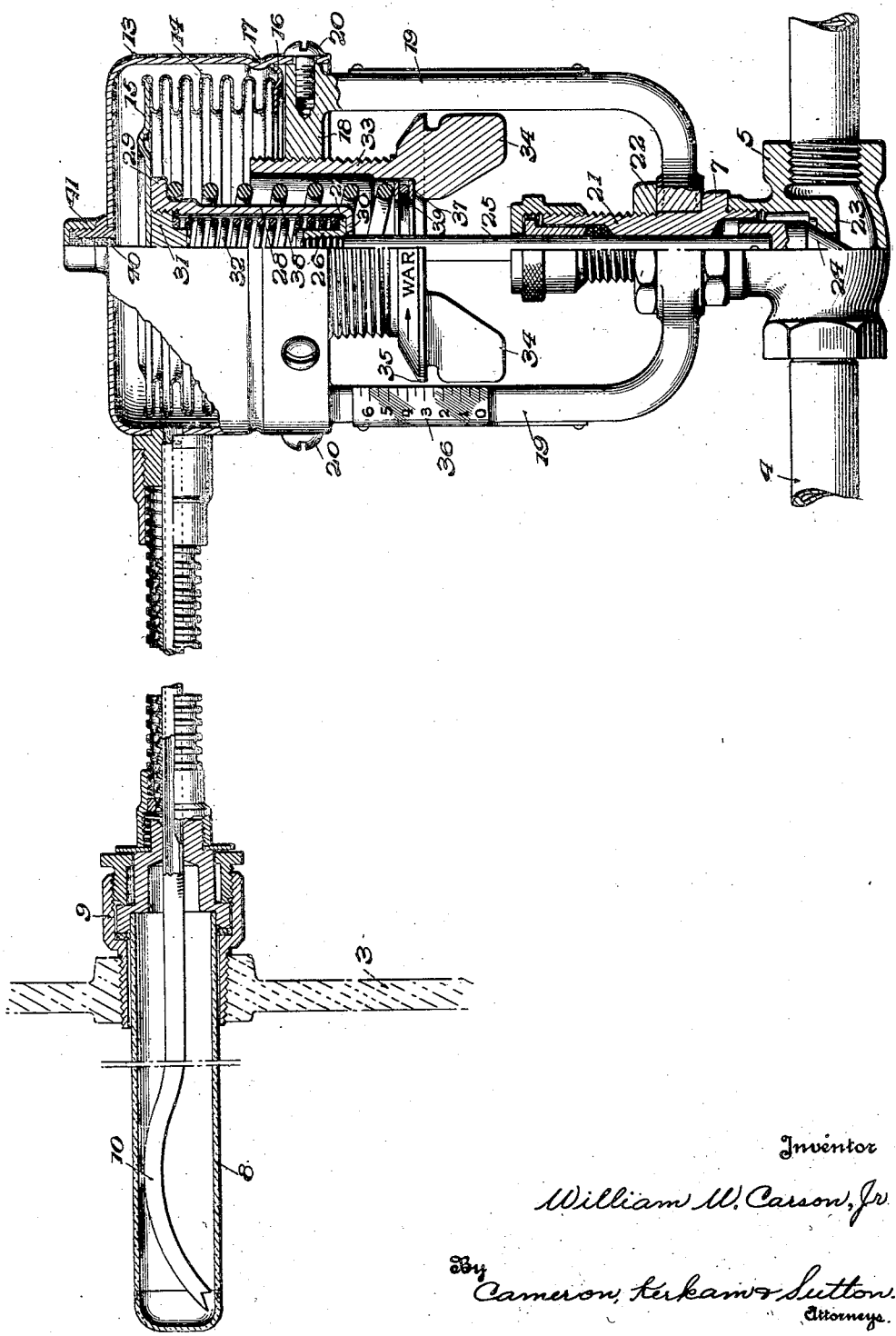

Patented Nov. 21, 1933

1,936,325

UNITED STATES PATENT OFFICE 1,936,325

TEMPERATURE REGULATOR

William W. Carson, Jr., Knoxville, Tenn., assignor to The Fulton Sylphon Company, Knoxville, Tenn., a corporation of Delaware Application May 12, 1931. Serial No. 536,897

8 Claims. (Cl. 236—99)

This invention relates to improvements in temperature regulators and more particularly to that type of regulator in which a thermosensitive fluid controls the flow of a heating medium.

Devices including a thermostatically operated valve positioned in the supply line of a heating medium have heretofore been used for regulating temperatures. Further, yielding connections between the valve and thermostat motor have been provided in such devices, but in these constructions the thermostat has been so charged with the thermosensitive fluid that when the bulb of the thermostat is subjected to excessive temperatures the motor is sometimes damaged even with the yielding connection.

One of the objects of the present invention is to provide a temperature regulator in which the possibility of damage to the motor is minimized even though the heat sensitive element is subjected to excessive temperature conditions.

Another object of the present invention is to provide a novel thermostat for a temperature regulator which may be used when the thermo-sensitive element is at a higher, lower, or substantially the same temperature condition as the motor.

Another object of the present invention is to provide a novel temperature regulator in which a relative movement may take place between the motor and controlled element after the controlled element has reached a positive limit in its movement.

Another object of the present invention is to provide a novel temperature regulator which is compact, simple, and economical of manufacture, possessing material advantages of construction, and which is efficient for the purpose intended.

These and other objects will be more apparent from the following description and the drawing in which like reference characters denote like parts throughout the several views. It is to be expressly understood, however, that the drawing is for the purpose of illustration only and is not a definition of the limits of the invention reference being had for this purpose to the appended claims.

In the drawing:

The figure is a longitudinal view partly in section of a temperature regulator incorporating the novel features of the present invention.

Referring to the drawing, the embodiment of the invention selected for illustration includes a container for a fluid 3, the temperature of which is to be regulated, such for instance, as a tank, vat, reservoir or the like. A pipe line 4 adapted to supply heating medium to the container 3 is shown with a valve casing 5 for regulating the flow, said casing being provided with a suitable bonnet 7 as shown.

The thermosensitive element of the temperature regulator consists of a bulb 8 which extends into the container 3 and is mounted in any suitable way, as by a nipple 9, threaded into the wall of the container 3. This bulb 8 is adapted to contain a suitable thermosensitive fluid which has a boiling point, at atmospheric pressure, somewhat lower than the minimum of the range of temperatures to be controlled. A tube 10 extends from the interior of the bulb 8 and connects the interior of the bulb with the motor element of the regulator. Preferably the inner end of said tube is bent to provide a trap as shown. Exteriorly of said bulb said tube may take the form of either a long or short conduit, which may be either flexible or rigid as preferred, and extends to the motor element which may be disposed either relatively adjacent the bulb or relatively remote therefrom.

The motor element includes a shell 13 which constitutes the stationary part of the motor element and, together with a collapsible and extensible bellows 14 telescoped within the shell, forms a closed chamber in communication with the interior of the bulb 8. The bellows has a tubular corrugated wall to provide the necessary flexibility, and is closed at its inner end by a rigid head 15. The open and outer end of the bellows is sealed to the inner cylindrical wall of the shell adjacent its open end, as by means of a ring 16, and annular bead 17 being provided in the shell to facilitate the making of such connection. In this cup shaped thermostat the head 15 of the bellows constitutes a movable wall for the sealed chamber which is subjected to the pressure of the thermosensitive fluid in the bulb.

A frame having an apertured wall 18 and axially extending arms 19 is mechanically connected to the shell 13 by means of cap screws 20. The arms 19 extend for a distance parallel with the axis of the shell and are then bent inwardly to form a collar surrounding the bonnet 7; the bonnet being rigidly secured to the collar by the threaded portion 21 and a nut 22.

A suitable valve seat 23 is provided within the valve casing 5 and together with a cooperating valve member 24 of any suitable character regulates the flow of a heating medium. The valve member 24 is provided with a stem 25 extending through the bonnet 7 and between the arms 19 of the frame, the outer end having a threaded portion adapted to receive a collar 26 with a radial flange 27.

Between the movable head 15 of the bellows and the flange 27 of the valve stem a yielding connection is provided allowing relative movement between the head 15 and valve member after the valve member has seated at 23 and reached a positive limit in its movement. This connection comprises a hollow cylindrical actuating member 28 having an outwardly extending radial flange 29 at one end, engaging the head 15 of the bellows, and an inwardly extending flange 30 at the other end forming an internal annular seat for the flange 27 on valve stem 25. The hollow actuating member 28 at the end engaging the head 15 is interiorly threaded for receiving an adjusting nut 31. In assembling this construction the valve stem 25 is extended into the hollow actuating member 28 and the collar 26 positioned on the threaded portion so that the flange 27 of the collar will engage the annular seat 30. A spiral compression spring 32 is then positioned within the hollow actuating member, engaging the flange 27 at one end and, the nut 31 is threaded into the member 28 at the other end, for yieldingly holding the flange 27 against the annular seat 30. The tension with which the two flanges are held in engagement may be varied by the nut 31 for increasing or decreasing the compression of the spring 32.

Surrounding the actuating member a structure is provided for holding the actuating member 28 in engagement with the head 15 and for varying the temperature at which the regulator will operate. To this end a hollow nut 33 is provided having a threaded engagement with the apertured wall 18 of the frame, and surrounding the valve stem 25 and actuating member 28. Wings 34 extend outwardly from the end of the nut to facilitate easy adjustment and for purposes of indication the nut is provided with a cut-away portion forming a sharp edge 35. A scale 36 is positioned on the arms 19 to cooperate with the edge 35 of the nut; the scale being calibrated in suitable units to indicate the position of the nut relative to the position of the head 15. Interiorly of the nut a shoulder 37 provides a seat for a spiral compression spring 38 surrounding the actuating member and engaging the radial flange 29 at its other end. A thrust bearing 39 of any suitable type may be provided between the seat 37 and the spring 38 to facilitate relative rotation between the nut and spring and provide an easy adjustment.

A charging port 40 in the wall of the shell 13 is provided for charging the regulator with a universal charge of thermosensitive fluid in liquid form. This universal charge consists in providing a volume of thermosensitive fluid which is substantially equal to the volume of the chamber formed by the shell 13 and bellows 14 when the bellows is in its fullest collapsed position. Also the volume of the bulb 8 is made such that the entire charge may be held in the bulb. With such a charge of thermosensitive fluid, where either the bulb or the motor may hold the entire volume, the temperature regulator may be used when the bulb is at a higher temperature than the motor or when the motor is at a higher temperature than the bulb, or when the bulb and motor are at approximately the same temperature but varying one above the other. This is due to the fact that the thermosensitive fluid when subjected either in the bulb or motor to a high temperature will be vaporized and forced over to the other unit where the vapor will be condensed and held in liquid form, but after a static condition has been reached, the vapor in the presence of its liquid will respond in pressure to any change of temperature in the medium to be regulated. When any abnormal temperature conditions are encountered in the medium to be regulated the fluid will be forced from the high temperature element into the low temperature element where it will be condensed and stored, and as the liquid thermosensitive charge is there out of contact with the excessive temperature, further increase of pressure will not take place because of the condensation of the vapor in the cool element as fast as the vapor is displaced from the hot element as the temperature rises. After the proper charge has been put into the system a cap 41 is sealed over the port 40 by any suitable means such as brazing, welding or soldering, and the bulb and motor units are thus tightly sealed.

The operation is as follows: In controlling the temperature of a medium in a container 3 such as a tank, refrigerating unit, vat or the like, the flow of a heating medium is controlled by the valve 24 in the conduit 4. The bulb 8 being positioned in the medium of which the temperature is to be regulated, an increase of temperature of said medium increases the temperature of the thermosensitive fluid, causing the same to vaporize and exert pressure through the tube 10 on the liquid in the sealed chamber formed by the shell 13 and bellows 14. This pressure acting on the head 15 of the bellows 14 will cause the same to move against the action of the spring 38. This movement of the head will move the actuating member 28 in the same direction, together with the valve stem 25 yieldingly connected therewith by means of the spring 32. This movement of the valve stem 25 moves the valve member 24 toward the seat 23 and decreases the orifice through which the heating medium may flow. The greater the increase in temperature of the thermosensitive fluid in the bulb 8 the greater will be the pressure exerted on the bellows head 15 and the greater will be the movement of the valve member 24 toward the seat until such time as the valve is entirely closed preventing any flow of the heating medium. After the valve member 24 has reached the seat 23 and is prevented from further movement, relative movement may then take place between the actuating member 28 and the stem 25 causing merely the compression of the spring 32, and preventing excessive strain on the bellows after the valve stem has come to a positive stop. This movement may continue until the bellows is almost in its fullest collapsed position and nearly the entire charge is in the chamber between the bellows and shell 13. At this time only vapor remains in the bulb 8 for subjection to the high temperature, and the displacement of vapor from the bulb by any increase in temperature is accompanied by a condensation exteriorly of the bulb, so that further increase of pressure in the motor does not take place. During this time the valve 24 remains closed as the bellows moves to its fullest extent beyond the position necessary to close the valve without any strains being exerted due to the positive stop. The motor of the regulator will remain in this condition until such time as the temperature of the medium to be regulated returns to normal at which time the spring 38 will force the head 15 back to its normal position forcing part of the charge of thermosensitive fluid back into the bulb 8 and the normal operation of the regulator is again established. The cup shaped thermostat illustrated and described is particularly advantageous in this construction in that the pressure is on the outside of the bellows which prevents misalignment and distortion of the bellows when the regulator is subjected to excessive pressures. The temperature at which the regulator operates may be set by the nut 33 which thus varies the initial pressure of the spring 38 and the temperature at which the thermosensitive fluid will operate the motor; the particular setting being indicated by the scale 36 and sharp edge 35 of the nut. It will be readily apparent that, when this temperature regulator is used under conditions where the motor will be at a higher temperature than the bulb, the shell 13 will be filled with a superheated vapor by means of which a vapor pressure generated in bulb 8 will be transmitted to head 15, and that movement of head 15 will be equally as positive as if this pressure were transmitted through liquid. It will also be evident that valve 24, as shown, will close as the temperature surrounding bulb 8 rises. In this form the regulator is generally used for control of a heating medium such as steam or gas. By reversing the position of valve 24 the regulator may be caused to open the valve on rising temperature around bulb 8. In this form the regulator is generally used for control of a cooling medium such as brine or cooling water. Even though valve 24 is reversed, the slip connection remains as shown and serves to prevent excessive pressures from resulting from excessive temperatures at bulb 8. It is also apparent that the tube 10 may communicate with the expansible and collapsible chamber between the shell 13 and bellows 14 through the end wall of the shell as well as the lateral wall thereof.

It will now be readily apparent that a temperature regulator has been provided which is positive in operation and in which danger of damage to the bellows is minimized when any part of the device is subjected to excessive temperatures and the valve is in a closed position. Further, it will be apparent that by use of the universal charge the regulator may be used when the motor is at a temperature higher, lower or substantially the same as that of the bulb.

It will also be obvious that the invention is not limited to the specific form described and illustrated in the drawing, but is capable of a variety of mechanical embodiments. Various changes which will now appear to those skilled in the art may be made in the form, details of construction, and arrangement of parts without departing from the spirit of the invention, and reference is therefore to be had to the appended claims for a definition of the limits of the invention.

What is claimed is:

1. In a temperature regulator, a thermostat having a motor actuated by a thermosensitive fluid comprising a cylindrical shell closed at one end, means including a collapsible and extensible bellows within the shell having a head at one end adjacent the head of the cylindrical shell and connected at the other end to the inner wall of the shell, a frame supporting said motor at the open end of the shell, a hollow nut threaded in said frame, an actuated spindle having a flange at one end engaging said head and extending into said hollow nut, and a spring between said nut and flange for holding the spindle against the head and adjusting the temperature at which the thermostat will operate.

2. In a temperature regulator, a thermostat having a motor actuated by a thermosensitive fluid comprising a cylindrical shell closed at one end, a collapsible and extensible bellows within the shell connected at one end to the inner wall of the shell and having a head at the other end, an apertured wall at the open end of the shell, a nut threaded in said aperture, an actuating member, a spring between said nut and actuating member for holding the same against the bellows head, an actuated member, and a spring for holding the actuating and actuated members in operative relation.

3. In a temperature regulator, a thermostat including a bellows actuated by a thermosensitive fluid, an actuated member provided with a flange, and a yielding connection between the bellows and actuated member comprising an intermediate member having one end engaging the bellows and a flange at its other end for positively engaging the flange on the actuated member in one direction, resilient means within said intermediate member for holding the flanges on the actuated member and intermediate member in positive engagement, and an adjustable plug engaging said resilient means and mounted in said intermediate member at the end thereof which is opposite to said engaged flanges.

4. In a temperature regulator, a thermostat having a collapsible and extensible bellows actuated by a thermosensitive fluid, an actuated member, and a yielding connection between said bellows and actuated member comprising a hollow cylindrical intermediate member engaging the bellows at one end and flanged at its other end to form an annular seat, a flange on said actuated member cooperating with said seat, a spring within said hollow intermediate member for yieldingly holding the flange on the actuated member against the seat on the intermediate member, and a second resilient member surrounding said cylindrical member and opposing its movement under expansion of said bellows.

5. In a temperature regulator, a thermostat including a collapsible and extensible bellows adapted to be actuated by a thermosensitive fluid, a valve, and a yielding connection between said bellows and valve comprising a hollow cylindrical actuating member having an outwardly disposed flange at one end positioned against the bellows and an inwardly disposed flange forming a seat at the other end, a valve stem for said valve having an annular flange cooperating with the seat formed in the actuating member, a spring in said hollow actuating member for holding the two flanges in yielding engagement, and a spring surrounding said hollow actuating member and engaging the outwardly disposed flange for controlling the temperature at which said regulator will operate.

6. In a temperature regulator, a thermostat including a collapsible and expansible bellows adapted to be actuated by a thermosensitive fluid, a valve, and a yielding connection between said bellows and valve comprising a hollow cylindrical actuating member having an outwardly disposed flange at one end engaging the bellows and an inwardly disposed flange at the other end forming an annular seat, a valve stem for said valve having a flange cooperating with said seat, a spring in said actuating member for holding the valve stem in operative engagement with the actuating member, a spring surrounding said actuating member for controlling the movement of the bellows, and independent adjusting means for each of the springs.

7. In a temperature regulator, a thermostat comprising a bulb adapted to be positioned in a medium the temperature of which is to be regulated, an expansible and collapsible vessel communicating with said bulb, means to be controlled, and connecting means between said vessel and said means to be controlled, said connecting means including a member moved by the expansion of said vessel and provided with a flange, a flange operatively connected to said means to be controlled, and a spring normally holding said flanges in engagement but yieldable when said means to be controlled has reached a limit position whereby said vessel may continue to expand through a predetermined distance without injury to said means to be controlled, said bulb and said vessel being charged with a volatile fluid, and said bulb and vessel being of such capacity with respect to said charge that the entire liquid charge may be received in said bulb when said bulb is at a cooler temperature than said vessel and the entire liquid charge may be received in said vessel when said vessel is at a cooler temperature than said bulb and said vessel has expanded to substantially its limit position by reason of the yielding of said spring.

8. In a temperature regulator, a thermostat comprising a bulb adapted to be positioned in a medium the temperature of which is to be regulated, an expansible and collapsible vessel communicating with said bulb, said expansible and collapsible vessel having a rigid outer wall and an expansible and collapsible bellows forming an inner wall and having one end sealed to said rigid wall and its opposite end movable, a member to be controlled, and connecting means between the movable end wall of said vessel and said means to be controlled, said connecting means including a member moved by the expansion of said vessel and provided with a flange, a flange operatively connected to said means to be controlled, and a spring normally holding said flanges in engagement but yieldable when said means to be controlled has reached a limit position whereby said vessel may continue to expand through a predetermined distance without injury to said means to be controlled, said bulb and said vessel being charged with a volatile fluid, and said bulb and vessel being of such capacity with respect to said charge that the entire liquid charge may be received in said bulb when said bulb it at a cooler temperature than said vessel and the entire liquid charge may be received in said vessel when said vessel is at a cooler temperature than said bulb and said vessel has expanded to substantially its limit position by reason of the yielding of said spring.

WILLIAM W. CARSON, Jr.